United States Patent
Kotheimer et al.

[11] 3,992,649
[45] Nov. 16, 1976

[54] CURRENT DIFFERENTIAL FAULT DETECTION CIRCUIT

[75] Inventors: William C. Kotheimer, Lansdowne; Stanley B. Wilkinson, Havertown, both of Pa.

[73] Assignee: General Electric Company, Philadelphia, Pa.

[22] Filed: Feb. 10, 1975

[21] Appl. No.: 548,849

[52] U.S. Cl. .............................. 317/26; 317/36 TD; 317/31; 317/27 R
[51] Int. Cl.² ........................ H02H 7/22; H02H 3/38
[58] Field of Search ............... 317/26, 27 R, 36 TD, 317/18 R, 18 D, 33 SC, 31

[56] References Cited
UNITED STATES PATENTS

| | | | |
|---|---|---|---|
| 2,548,625 | 4/1951 | Seeley.................................. | 317/26 |
| 3,160,788 | 12/1964 | Antoszewski et al........... | 317/36 TD |
| 3,602,771 | 8/1971 | Walstad et al.............. | 317/36 TD X |
| 3,633,071 | 1/1972 | Fendt et al........................ | 317/26 |
| 3,668,470 | 6/1972 | Ambler et al................... | 317/27 R X |
| 3,683,237 | 8/1972 | Walstad et al.................. | 317/36 TD |
| 3,723,815 | 3/1973 | Ambler et al................. | 317/27 R X |

Primary Examiner—Harold Broome
Assistant Examiner—Patrick R. Salce
Attorney, Agent, or Firm—J. Wesley Haubner

[57] ABSTRACT

A current differential fault detection circuit. This circuit is used with a plurality of main current transformers respectively coupled to a plurality of separate conductors through which current flows into and out of a sectionalized portion of an a-c electric power system. The secondary windings of the main current transformers are connected in parallel with one another. A normally non-conducting solid state a-c switch is connected in series with the primary winding of an auxiliary transformer and the series combination is connected in parallel with the secondary windings of the main current transformers. Circuit means is provided for sensing the voltage across the secondary windings of the main current transformers. When the secondary winding voltage exceeds a predetermined level the a-c switch is triggered into conduction thereby allowing the fault current to flow through the primary winding of the auxiliary transformer. Circuitry connected to the secondary winding of the auxiliary transformer senses the fault current level and produces an output when the fault current exceeds a predetermined level.

19 Claims, 3 Drawing Figures

CURRENT DIFFERENTIAL FAULT DETECTION CIRCUIT

BACKGROUND OF THE INVENTION

This invention relates to protective relays for electric power generation and distribution systems, and more particularly to an improved current differential protective system of the type disclosed and claimed in U.S. Pat. No. 2,548,625, Seeley.

Heretofore current differential protective arrangements have been commonly used to protect electrical apparatus. For instance in power bus installations wherein a number of source and feeder lines are connected to the bus through circuit breakers it has been the practice to connect current transformers in each source and feeder line and to connect all of the current transformer secondaries in parallel. Appropriate circuitry responsive to the current flow in the transformer secondaries detects the occurrence of an internal fault condition.

In accordance with one embodiment described in the Seeley patent, a circuit consisting of a voltage responsive relay in series with a tuned circuit resonant at the fundamental power frequency, is placed in parallel with the current transformer secondaries. The voltage responsive relay will pick up when an abnormal voltage such as that caused by an internal fault condition appears at the current transformer secondaries. A voltage limiting non-linear resistor, such as a thyrite, across the current transformer secondaries limits the voltage that can be developed across the voltage responsive relay. Seeley describes a second embodiment that has a faster response in which an over current relay connected in series with the non-linear resistor picks up as soon as appreciable current begins flowing therethrough. When either the voltage responsive relay or the current relay picks up all of the circuit breakers are tripped and the secondaries of the current transformers are shorted to make sure that the power rating of the current and voltage relays and the variable resistor are not exceeded.

One disadvantage of the Seeley circuit is that it has a slow response to a fault condition. Since the tuned circuit is essentially a filter, there is a delay of 0.05 to 0.10 seconds before there is adequate current to operate the voltage responsive relay. Even though there is no filter in circuit with the current responsive relay, the current relay will have a relatively slow response to the fault current level just above the minimum current required to operate the current relay. According to the Seeley patent this delay is about 0.016 to 0.05 seconds.

Another disadvantage of the circuits described in Seeley occurs when the fault indication relay initiates the tripping of the circuit breakers but all of the circuit breakers do not clear and the fault current falls to a level below the minimum current level required to operate the current sensitive relay. The reduced current causes the current sensitive relay to drop out even though there is a fault condition. In such a case it would be desirable to have the fault monitoring circuit be responsive to a lower level of fault current after a fault has been detected and action has been taken to operate the circuit breakers.

Another disadvantage of circuits that use a thyrite voltage limiting device as described in Seeley is that the thyrite does not have a sharp voltage versus current characteristic. As a result, during the operate time of the protective circuit, the voltage applied might exceed the insulation breakover level.

For a more detailed explanation of the operation and the application of this prior art arrangement see the aforementioned Seeley patent and also a paper entitled "Instantaneous Bus-Differential Protection Using Bushing Current Transformers" by H. T. Seeley and F. von Roeschlaub, 67 AIEE Transactions 1709–1719 (1948).

It is therefore a principal object of this invention to provide an improved current differential internal fault protective circuit.

It is another object of this invention to provide a current differential internal fault protective circuit having a faster response time.

It is another object of this invention to provide a current differential internal fault protective circuit that responds instantaneously to the magnitude of the fault voltage.

It is yet another object of this invention to provide a current differential internal fault protective circuit that uses a first current level for detecting a fault condition and continues to indicate the fault condition until the fault current falls below a second current level significantly lower than the first current level.

SUMMARY OF THE INVENTION

The current differential internal fault protective circuit of this invention, in one form, is used with a plurality of main current transformers respectively coupled to a plurality of separate conductors through which current flows into and out of a sectionalized portion of an a-c electric power system. The secondary windings of the main current transformers are connected in parallel with one another. The current transformers are chosen so that the voltage across the paralleled secondary windings will be less than a predetermined magnitude as long as there is no fault in the sectionalized portion of the power system. To detect the occurrence of a fault within the sectionalized portion of the power system a normally non-conducting solid state a-c switch is connected in series with the primary winding of an auxiliary transformer and the series combination is connected in parallel with the secondary windings of the main current transformers. Circuit means is provided for sensing the voltage across the secondary windings of the main current transformers. When the secondary winding voltage exceeds a predetermined level the a-c switch is triggered into conduction thereby allowing the fault current to flow through the primary winding of the auxiliary transformer. Circuitry connected to the secondary winding of the auxiliary transformer senses the fault current level and produces an output when the fault current exceeds a predetermined level. Preferably the current level sensing circuitry also includes means for preventing the production of the output signal unless the fault current exceeds the predetermined level and remains above this level for a predetermined interval of time. Thus, the operation of the current differential internal fault protective circuitry is initiated as a result of an abnormal increase in the magnitude of voltage across the parallel secondary windings of the main current transformers, but no output signal is produced unless the fault current exceeds the predetermined threshold magnitude for the predetermined interval of time. The predetermined fault current level and the predetermined interval of time can be selected so as to avoid false operation in response to lightning arrestor follow current which typically has a lower current level and is of shorter duration than that produced by a genuine internal fault.

DESCRIPTION OF THE DRAWINGS

While the specification concludes with claims particularly pointing out and distinctly claiming that which is regarded as the present invention the objects and advantages of this invention can be more readily ascertained from the following description of a preferred embodiment when read in conjunction with the accompanying drawings in which:

DETAILED DESCRIPTION

Figure 1:
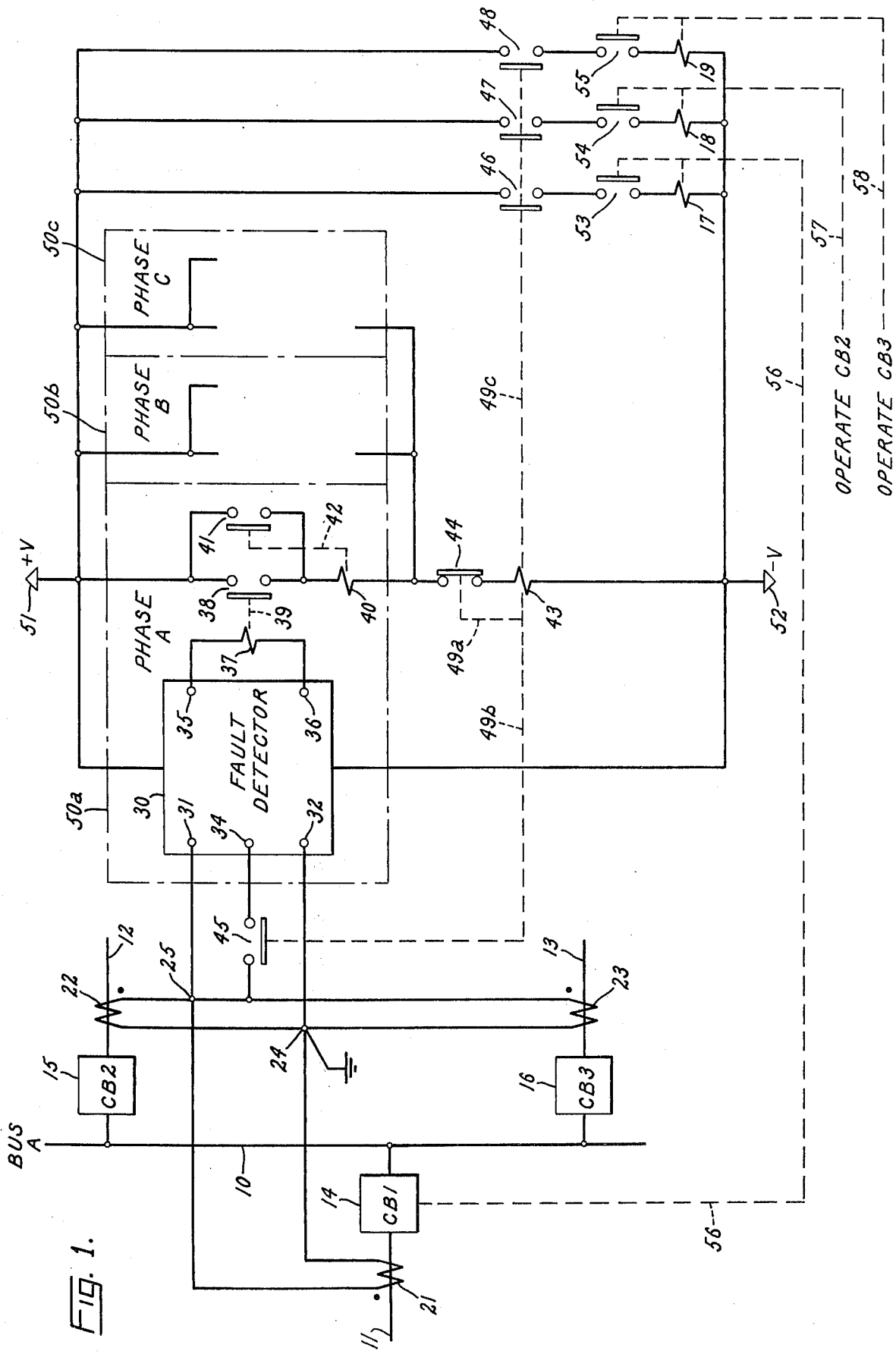
FIG. 1 is a schematic representation of an electric power bus together with the fault detection circuit of this invention.

Referring now to FIG. 1 there is shown the phase A bus 10 of an a-c electric power system. Source line 11 and feeder lines 12 and 13 are connected to the bus 10 through circuit breakers 14, 15, and 16 respectively. Circuit breakers 14 through 16 are provided with trip coils 17 through 19 respectively. Current transformer 21 measures the current flowing in source line 11, current transformer 22 measures the current flowing in feeder line 12 and current transformer 23 measures the current flowing in feeder line 13. The secondary windings of current transformers 21, 22 and 23 are connected in parallel at common terminals 24 and 25. If desired one of these terminals such as 24 may be grounded. The signal appearing across the secondary windings of current transformers 21, 22 and 23 is applied to terminals 31 and 32 of fault detector circuit 30. The output of fault detector circuit 30 appears at terminals 35 and 36 and energizes a coil 37 of a fault relay which operates normally open contacts 38 as indicated by dashed line 39. When the contacts 38 of the fault relay close, the coil 40 of a target seal-in relay and the coil 43 of a lockout relay will be energized from power sources 51 and 52. When the target seal-in relay is energized it will operate normally open contacts 41 as indicated by dashed line 42. When lockout relay coil 43 is energized it will operate contacts 44, 45, 46, 47, and 48 as indicated by dashed lines 49a, 49b, and 49c respectively. The fault detector circuit 30 and its associated fault relay and target seal-in relay which are used to monitor the condition of phase A are shown enclosed within a block 50a. Similar fault detector circuits and associated fault relays and target seal-in relays are used to monitor the condition of phases B and C as indicated by blocks 50b and 50c respectively.

Contacts 53, shown in series with contacts 46 and trip coil 17, is an auxiliary contact of circuit breaker 14 and is controlled by trip coil 17. Contacts 54 and 55 are similarly controlled by and connected in series with trip coils 18 and 19 respectively. When trip coils 17, 18, and 19 are energized they will open circuit breakers 14, 15, and 16, respectively, as indicated by the dashed lines 56, 57, and 58.

For the sake of completeness a brief explanation of the operation of the circuit of FIG. 1 in response to the occurrence of a fault will now be presented. When a fault occurs on bus 10, the current transformers 22, 23 and 24, produce an operating voltage at the input terminals 31, 32 of fault detector 30, thereby energizing coil 37 of the fault relay which closes contacts 38. When contacts 38 are closed the coil 40 of the target seal-in relay and relay coil 43 will both be energized. When the coil 40 of the target seal-in relay is energized contacts 41 close which provides for the continued energization of relay coils 40 and 43 even though fault relay contacts 38 later open. When relay coil 43 is energized contacts 46, 47, and 48 will be made to close. Since the circuit breaker auxiliary contacts 53, 54, and 55 are closed when the circuit breakers are closed, trip coils 17, 18, and 19 will all be energized and will act to open their respective circuit breakers 14, 15, and 16. When the coil 43 of the lockout relay is energized contacts 44 will open which removes power from the target seal-in relay coil 40 and the lockout relay coil 43. When the coil 43 of the lockout relay is energized it also closes contacts 45 which short together input terminals 31 and 34 of the fault detector 30 for a reason that will be explained in the description of FIG. 2.

Figure 2:
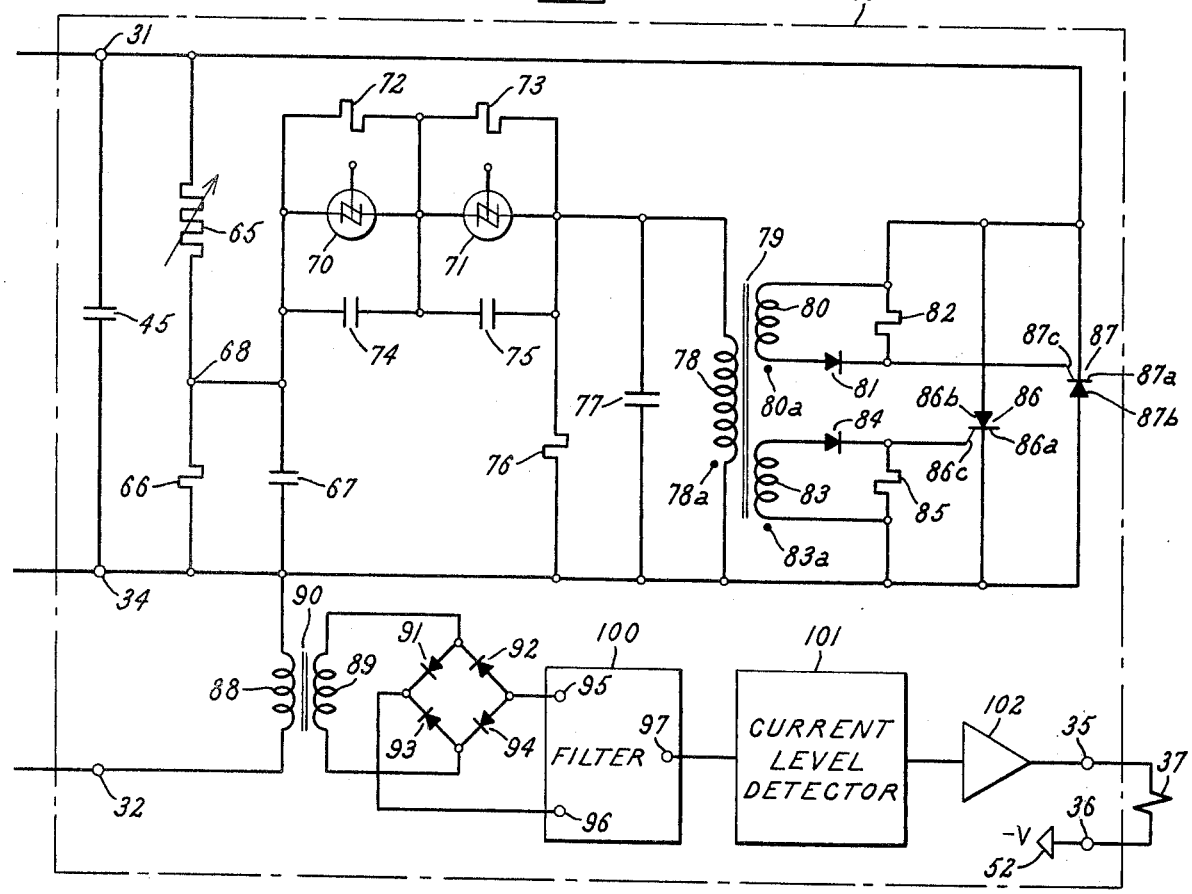
FIG. 2 is a schematic diagram, partially in block form, of the fault detection circuitry of FIG. 1.

Referring now to FIG. 2, there is shown input terminals 31 and 32 of fault detector circuit 30 which are connected to the paralleled secondary windings of current transformers 21, 22, and 23, shown in FIG. 1. The signal appearing at input terminals 31 and 32 are applied to the series combination of a variable resistor 65, a fixed resistor 66, and the primary winding 88 of an auxiliary transformer 90. The magnitude of the fault voltage that will initiate fault detector action is established by the value of variable resistor 65 and the breakdown voltage of silicon bilateral switches 70, 71. When the instantaneous fault voltage appearing across input terminals 31 and 32 exceeds a predetermined threshold value, the voltage appearing at terminal 68 of the voltage divider will exceed the breakdown voltage of silicon bilateral switches 70 and 71 thereby making the silicon bilateral switches conductive which provides a low impedance discharge path for the charge stored on capacitor 67 through the primary winding 78 of transformer 79. If input terminal 31 is more positive than input terminal 32 current will flow out of that end of primary winding 78 marked by dot 78a which causes current to flow into that end of secondary winding 83 marked by dot 83a and also causes current to flow into that end of secondary winding 80 marked by dot 80a. Since the current flow through the secondary winding 83 is in the forward direction of diode 84, the gate 86c of thyristor 86 will be at more positive voltage than cathode 86a of thyristor 86 and thyristor 86 will be made conductive. When thyristor 86 is conductive substantially all of the fault current provided by the secondary windings of current transformers 21, 22, and 23 will flow through thyristor 86 and through the primary winding 88 of auxiliary transformer 90. When the current flow in the secondary 83 of transformer 79 is in the direction to gate thyristor 86 on, the current flowing in secondary 80 of transformer 79 will be in the back direction of steering diode 81 so that substantially no current flows in the secondary winding 80. Thus, practically all of the stored energy on capacitor 67 is being used to turn on thyristor 86. In a similar manner, if the potential of input terminal 32 is greater than that of input terminal 31, and the magnitude of the fault voltage exceeds the predetermined level, current will flow in the opposite direction of the secondary windings 80 and 83 which will cause thyristor 87 to conduct and substantially all of the fault current will flow through the primary winding 88 of auxiliary transformer 90.

The fault signal appearing across the secondary winding 89 of auxiliary transformer 90 is rectified by diodes 91 through 94. The d-c voltage output of the full wave rectifier is applied to input terminals 95 and 96 of filter 100. The output of filter 100 which appears at terminal 97 is applied to the input of a current level detector 101 which drives amplifier 102 and controls the energization of fault relay coil 37.

Resistor 72 and capacitor 74, connected in parallel with silicon bilateral switch 70, and resistor 73 and capacitor 75, connected in parallel with silicon bilateral switch 71, provide both low frequency and high frequency equalization of the voltage across the silicon bilateral switches 70, 71. Capacitor 77 in parallel with primary winding 78 of transformer 79 provides a low impedance path for high frequency surges which may appear across input terminals 31 and 32. Resistor 76 provides damping of the tuned circuit formed by capacitor 77 and the primary winding 78 of transformer 79.

The voltage sensing portion of fault detector 30, as just described, has been designed to initiate fault detection when the instantaneous voltage exceeds the predetermined threshold level as determined by adjusting variable resistor 65. Although capacitors 67 and 77 provide some filtering of the monitored signal, their values are chosen so that they filter high frequency surges but have practically no effect on signals at the line frequency of the power system thereby providing a fast response to a fault condition. Since the voltage sensing portion of fault detector 30 reacts to the instantaneous voltage at the input terminals 31, 32, and due to the sharp voltage versus current breakdown characteristic of silicon bilateral switches 70, 71 the voltage at the input terminals 31, 32 is limited to the voltage setting as determined by the setting of variable resistor 65 which is selected to be below the insulation breakover level. Furthermore, once thyristors 86 or 87 become conductive, the voltage at input terminals 31, 32 will be limited to several volts.

As explained in describing FIG. 1, when fault relay coil 37 is energized, it will operate the lockout relay which closes contacts 45. When contacts 45 are closed, thyristors 86 and 87 are short circuited so that the fault current flows directly through contacts 45 and primary winding 88 of auxiliary transformer 90. This reduces the power handling requirement of thyristors 86 and 87 and provides for continued monitoring of the fault current by current level detector 101 after a fault has been indicated.

Figure 3:
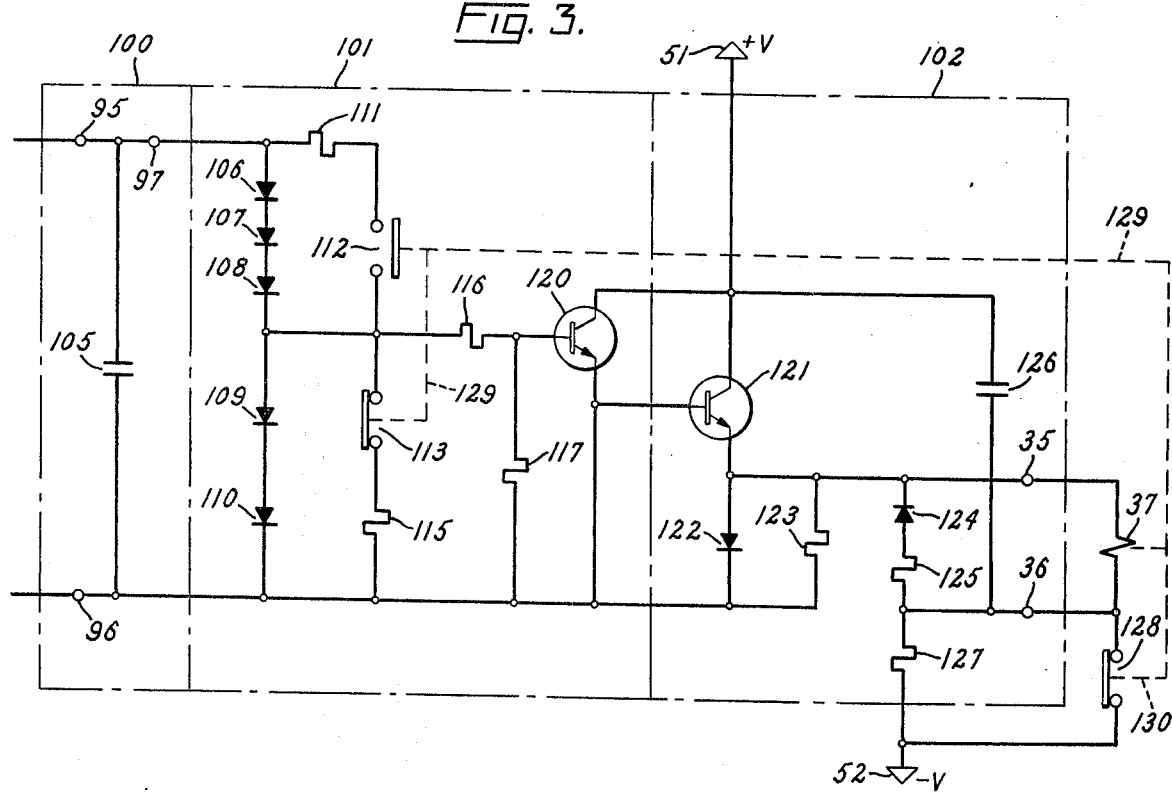
FIG. 3 is a schematic diagram of the filter current level detector and relay amplifier circuits shown in block form in FIG. 2.

Referring now to FIG. 3, the filter 100 is shown as comprising a single capacitor 105 across filter input terminals 95 and 96. The d-c voltage appearing across capacitor 105 will be related to the magnitude of the fault current flowing through the primary winding 88 of auxiliary transformer 90. As the signal applied to terminals 95 and 96 increases, increased current will flow through diodes 106, 107, 108, normally closed contacts 113, and through resistor 115. When the voltage developed across resistor 115 exceeds about 0.6 volts, transistor 120 will be made conductive which allows base current to be provided for transistor 121 thereby making transistor 121 conductive. When transistor 121 is conductive fault relay coil 37 will be energized from power sources 51 and 52. When fault relay coil 37 is energized it closes contacts 112 and opens contacts 113 as indicated by the dashed line 129, and opens contacts 128 as indicated by dashed line 130.

When the fault relay coil 37 is energized the full power supply voltage is applied directly across the coil 37 because contacts 128 are closed. Once the fault relay has picked up, contacts 128 will open and the current through the fault relay coil 37 will be limited by resistor 127 to that level of current required to maintain the relay in the energized condition.

Since the signal appearing at the input terminals 95, 96 of filter 100 is a full wave rectified signal that normally falls below the predetermined fault current level during the fault, there is the possibility that the fault relay contacts will chatter during certain fault conditions. This chattering is eliminated by closing contacts 112 which places resistor 111 in parallel with the diodes 106, 107, and 108. With relay contacts 112 closed, the voltage appearing on capacitor 105 will discharge through the circuit formed by resistor 111, closed contacts 112, resistor 116 and the emitter-base circuit of transistor 120. The time constant of this discharge path is such that capacitor 105 will maintain transistor 120 in the conductive state until the fault current signal appearing at terminals 95 and 96 reaches the predetermined fault current level on the succeeding half cycle.

When fault relay coil 37 operates to open contacts 113 and close contacts 112, the fault current level that controls the conduction of transistors 120 and 121 is determined by the values of resistors 111 and 117. The values of resistors 111 and 117 can be selected so that the fault relay remains energized even though the fault current level decreases substantially after the breakers have been tripped.

Diode 124 and resistor 125 provide a path for the current through fault relay coil 37 when transistor 121 is made nonconductive. Diode 122 limits the reverse voltage across the emitter base junction of transistor 121 under surge conditions and capacitor 126 provides surge protection for the collect-or-emitter circuit of transistor 121.

Diodes 109 and 110 serve two functions. First of all they operate in conjunction with diodes 106, 107, and 108 to limit the voltage that can appear on capacitor 105 to about 4 volts. Diodes 109 and 110 in conjunction with resistor 116 also limit the maximum voltage and current through the base-emitter circuit of transistor 120 upon the occurrence of a severe fault.

The circuit of FIG. 3 provides protection against false indications due to short duration surges. The fault current signal applied to capacitor 105 must be of sufficient amplitude and duration to charge capacitor 105 above the predetermined voltage level that will cause transistors 120 and 121 to conduct and to maintain that predetermined level long enough to pull in the fault relay. The current level amplitude that will cause transistors 120 and 121 to conduct is determined by the value of resistor 115 while the duration of the fault current signal required to charge capacitor 105 to that level is determined primarily by the value of capacitor 105.

Component values which operate with one embodiment of the fault monitor circuit herein described are as follows:

| 67 | capacitor | 1 microfarad |
|---|---|---|
| 70,71 | silicon bilateral switches | 2N4993 |

-continued

| | | |
|---|---|---|
| 72,73 | resistors | 1000 ohms |
| 74,75 | capacitors | 100 picofarad |
| 76 | resistor | 1500 ohms |
| 77 | capacitor | 0.001 microfarad |
| 79 | transformer | 1:1:1 |
| 81,84 | diodes | 1N4148 |
| 82,85 | resistors | 330 ohms |
| 86,87 | silicon controlled rectifiers | C137PB (GE designation) |
| 90 | transformer | 3:750 |
| 91–94 | diodes | 1N5061 |
| 105 | capacitor | 1.0 microfarad |
| 106–110 | diodes | 1N5061 |
| 111 | resistor | 3300 ohms |
| 115 | resistor | 360 ohms |
| 116 | resistor | 10 ohms |
| 117 | resistor | 4700 ohms |
| 120,121 | transistor | 2N3439 |
| 122 | diode | 1N5061 |
| 123 | resistor | 300 ohms |
| 124 | diode | 1N5061 |
| 125 | resistor | 1000 ohms |
| 126 | capacitor | 0.05 microfarad |
| 127 | resistor | 750 ohms |

While the present invention has been described with reference to a specific embodiment thereof, it will be obvious to those skilled in the art that various changes and modifications may be made without departing from the invention in its broader aspects. For example, although the protective system has been described as operating with a bus of an a-c power system, it will be clear to those skilled in the art that this invention has other uses such as the differential protection of shunt reactors and generators.

It is contemplated in the appended claims to cover all variations and modifications of the invention which may come within the true spirit and scope of the invention.

What we claim as new and desire to secure by Letters Patent of the United States is:

1. A differential protective circuit for detecting the occurrence of a fault within a portion of an a-c electric power system, said system including a plurality of separate conductors through which current flows into and out of said portion and a plurality of main current transformers, having secondary windings connected in parallel with one another, the voltage across the paralleled secondary windings being less than a predetermined magnitude in the absence of a fault in the protected portion of the power system, said circuit comprising:
    a. first circuit means for generating an output signal in response to fault current above a predetermined minimum magnitude,
    b. normally open switching means for connecting said first circuit means in parallel with the paralleled secondary windings of said main current transformers, and
    c. second circuit means responsive to the voltage across the paralleled secondary windings for actuating said switching means to closed position when the instantaneous voltage across said secondary windings attains a predetermined minimum magnitude, whereby fault voltage across said secondary windings connects said first circuit means for response to differential fault current in said secondary windings.

2. A differential protective circuit as recited in claim 1 wherein the second circuit means includes means for filtering high frequency surge signals and for preventing the switch from closing in response to said high frequency surge signals.

3. A differential protective circuit as recited in claim 1 wherein the first circuit output signal is generated after the fault current exceeds the predetermined magnitude for a predetermined interval of time.

4. A differential protective circuit as recited in claim 1 wherein the first circuit output signal is generated when the time integral of the fault current exceeds a predetermined magnitude.

5. A differential protective circuit as recited in claim 2 wherein the first circuit output signal is generated after the fault current exceeds the predetermined magnitude for a predetermined interval of time.

6. A differential protective circuit as recited in claim 2 wherein the first circuit output signal is generated when the time integral of the fault current exceeds a predetermined magnitude.

7. A differential protective circuit for detecting the occurrence of a fault within a portion of an a-c electric power system, said system including a plurality of separate conductors through which current flows into and out of said portion and a plurality of main current transformers, having secondary windings connected in parallel with one another, the voltage across the paralleled secondary windings being less than a predetermined magnitude in the absence of a fault in the protected portion of the power system, comprising:
    a. an auxiliary transformer having primary and secondary windings, the primary winding being connected to the paralleled secondary windings of the main current transformers through a normally non-conducting a-c switch;
    b. first circuit means, responsive to the voltage across the paralleled secondary windings, for closing the a-c switch when said voltage exceeds a predetermined magnitude whereby fault current is allowed to flow in the primary winding of the auxiliary transformer; and
    c. second circuit means connected to the secondary winding of the auxiliary transformer for generating an output signal when the fault current in the primary winding of the auxiliary transformer exceeds a predetermined magnitude.

8. A differential protective circuit as recited in claim 7 wherein the second circuit output signal is generated after the fault current exceeds the predetermined magnitude for a predetermined interval of time.

9. A differential protective circuit as recited in claim 7 wherein the second circuit output signal is generated when the time integral of the fault current exceeds a predetermined magnitude.

10. A differential protective circuit as recited in claim 7 additionally comprising means responsive to the second circuit output signal for short circuiting the a-c switch.

11. A differential protective circuit as recited in claim 8 additionally comprising means responsive to the second circuit output signal for short circuiting the a-c switch.

12. A differential protective circuit as recited in claim 7 wherein said power system conductors are respectively connected in the system by means of a corresponding plurality of circuit breakers that are tripped in response to the second circuit means output signal.

13. A differential protective circuit as recited in claim 7 wherein the a-c switch comprises a pair of normally non-conducting thyristors connected in inverse parallel relationship with each other.

14. A differential protective circuit as recited in claim 7 wherein the first circuit means closes the switch when said voltage instantaneously exceeds said predetermined magnitude.

15. A differential protective circuit as recited in claim 14 wherein the first circuit means additionally includes filter means for removing high frequency signals from said voltage.

16. A differential protective circuit as recited in claim 15 wherein the second circuit output signal is generated when the time integral of the fault current exceeds a predetermined magnitude.

17. A differential protective circuit as recited in claim 16 additionally comprising means responsive to the second circuit output signal for short circuiting the a-c switch.

18. A differential protective circuit as recited in claim 17 wherein the a-c switch comprises a pair of normally non-conducting thyristors connected in inverse parallel relationship with each other.

19. A differential protective circuit as recited in claim 18 wherein said power system conductors are respectively connected in the system by means of a corresponding plurality of circuit breakers that are tripped in response to the second circuit means output signal.

* * * * *